US008745484B2

(12) United States Patent
Roberts et al.

(10) Patent No.: US 8,745,484 B2
(45) Date of Patent: Jun. 3, 2014

(54) ADVANCED EMBED CODE

(75) Inventors: W. Jared Roberts, Seattle, WA (US); Paul Cho, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/340,369

(22) Filed: Dec. 29, 2011

(65) Prior Publication Data

US 2012/0266060 A1  Oct. 18, 2012

(51) Int. Cl.
  *G06F 17/00* (2006.01)
(52) U.S. Cl.
  USPC .......................... 715/234; 715/238; 715/205
(58) Field of Classification Search
  USPC .................. 715/234, 238, 239, 205
  See application file for complete search history.

(56) References Cited

U.S. PATENT DOCUMENTS

| | | | |
|---|---|---|---|
| 6,216,152 B1 | 4/2001 | Wong et al. | |
| 6,421,726 B1 | 7/2002 | Kenner et al. | |
| 7,738,833 B2 | 6/2010 | Bettis et al. | |
| 2002/0078144 A1 | 6/2002 | Lamkin et al. | |
| 2006/0155706 A1* | 7/2006 | Kalinichenko et al. | 707/10 |
| 2009/0006192 A1 | 1/2009 | Martinez et al. | |
| 2009/0024923 A1 | 1/2009 | Hartwig et al. | |
| 2009/0024927 A1 | 1/2009 | Schrock et al. | |
| 2009/0064005 A1 | 3/2009 | Cunningham et al. | |
| 2009/0089830 A1 | 4/2009 | Chandratillake et al. | |
| 2010/0005411 A1 | 1/2010 | Duncker et al. | |
| 2010/0010884 A1 | 1/2010 | Cohee et al. | |
| 2010/0022227 A1* | 1/2010 | Aaltonen et al. | 455/414.1 |
| 2010/0180201 A1* | 7/2010 | Gibby et al. | 715/716 |

FOREIGN PATENT DOCUMENTS

| | | |
|---|---|---|
| KR | 10-0989217 | 10/2010 |
| WO | 2008121733 A1 | 10/2008 |

OTHER PUBLICATIONS

Mark R Robertson, How to Publish HTML5 video Tag With Fallback Mechanism, Jun. 15, 2010, REELSEO, pp. 1-5 http://web.archive.org/web/20101013082941/http://www.reelseo.com/html-5-tutorial-video-fallback/.*
Michael, HTML5 Video with Flash Fallback / Flash Video with Mobile Fallback, Jul. 28, 2010, Labs.byHook, pp. 1-8 http://labs.byhook.com/2010/07/28/html5-video-with-flash-fallback-and-vice-versa/.*
Fabio Sonnati, Flash to HTML5 Fallback, Jan. 12, 2011, Flsah Video Technology and Optimizations, pp. 1-4 http://sonnati.wordpress.com/2011/01/12/flash-to-htm5-fallback/.*

(Continued)

*Primary Examiner* — Adam M Queler
*Assistant Examiner* — Howard Cortes
(74) *Attorney, Agent, or Firm* — Kilpatrick Townsend & Stockton LLP

(57) ABSTRACT

An embed code that can be copied from a first web site for placement in a second web site by users is disclosed. The embed code will render a content object from the second web site on a number of supported platforms. Autonomously, the embed code chooses from multiple playback options to choose one for the web browser rendering the embed code, for example, Flash,™ HTML5, Silverlight,™ or a media player. Wherever the embed code is placed in a web site, a wide range of end user devices are supported without needing to reference other locations on the Internet, i.e., the embed code alone can automatically configure to play on that wide range of end user devices. The content object may be hosted or stored in various locations with the embed code accessing the proper version of the end user device.

13 Claims, 9 Drawing Sheets

(56) References Cited

OTHER PUBLICATIONS

John Dyer, Simple Cross-Browser HTML5 video with a single H.264 file and Fallback options, Jun. 6, 2010, John Dyer's code pp. 1-5, http://johndyer.name/simple-cross-browser-html5-video-with-a-single-h-264-file-and-fallback-options/.*

Pile, A., "Three New Features: Universal Player, Watch Later and Roku," Staff Blog in Vimeo.com, retrieved on Feb. 24, 2012 from http://web.archive.org/web/20100821053657/http://vimeo.com/blog:334, Aug. 21, 2012, 20 pages.
Yokto ,Video Encoding and Transcoding, 2010, 4 pages.
VideoJs,HTML5 Video Player, 2011, 5 pages.
International Preliminary Report on Patentability for PCT/US2011/039172 mailed on Dec. 4, 2013, 5 pages.

* cited by examiner

ADVANCED EMBED CODE

BACKGROUND

This disclosure relates in general to video playback and, but not by way of limitation, to use of embed code that instructs a browser to play a video on multiple platforms.

More and more content is being viewed through a web browser. There are different versions of web browsers, on different platforms and different plugins. Most web browsers can understand HTML in some form and scripting languages, such as JavaScript.™ Video content is especially difficult to deliver through a web browser because of the differing capabilities for playback and decoding algorithms on different platforms. Phones are just one example of difficult platforms to deliver video content for.

A founding premise of the world wide web was to create content that could be enjoyed by all. Creating web content that can be enjoyed broadly is becoming increasingly difficult with the splintering of what web browsers can play back in terms of video content. Flash™-based content players are increasingly popular as are ones that use Silverlight.™ Flash™ is shunned by some device manufacturers, especially on cellular phones. Silverlight™ is proprietary to select operating systems. Content creators just want their web sites and video content to be enjoyed as broadly as possible.

When syndicating content for others, customers will create channels or videos that will playback their content when rendered in an end user's web browser. An end user may want to take a video and embed it in another web site, for example on a blog site, social network site, etc. Embedding of video in different sites creates unique problems for syndication. The second web site has no relationship with the syndicator, but still will render the customer's content. End user's expect the content to playback on any number of devices that might be used to view the second web site.

SUMMARY

In one embodiment, the present disclosure provides embed code that can be copied from a first web site for placement in a second web site by users. The embed code will render a content object from the second web site on a number of supported platforms. Autonomously, the embed code chooses from multiple playback options to choose one for the web browser rendering the embed code, for example, Flash,™ HTML5, Silverlight,™ or a media player. Wherever the embed code is placed in a web site, a wide range of end user devices are supported without needing to reference other locations on the Internet, i.e., the embed code alone can automatically configure to play on that wide range of end user devices. The content object may be hosted or stored in various locations with the embed code accessing the proper version of the end user device.

In another embodiment, a playback system for multi-platform playing of content with a web browser is disclosed. The playback system includes an embed code interface, a first content object having a first encode, a second content object having a second encode, and a third content object having a third encode. The embed code interface is hosted on a hardware server. The embed code interface provides embed code customized for content referenced on a web page. The embed code is end user accessible for copying and placement into another web page. The embed code uses a scripting language configured to perform device detection on an end user device. The first, second and third encodes are all representations of the content. The embed code is configured to cause playing of the first content object on the end user device using an interpreted language in a browser. The embed code is configured to cause playing of the second content object on the end user device using HTML5 playback using the interpreted language not occur. The embed code is configured to cause playing of the third content object on the end user device using a player resident on a wireless phone where playback using the interpreted language or HTML5 does not occur.

In yet another embodiment, a method for multi-platform playing of content with a web browser is disclosed. Embed code is customized for content referenced on a web page. The embed code is end user accessible for copying and placement into another web page. The embed code uses a scripting language configured to perform device detection on an end user device. The content is represented in first, second and third encoding formats respectively as first, second and third content objects. The embed code is configured to cause playing of the first content object on the end user device using an interpreted language in a browser. The embed code is configured to cause playing of the second content object on the end user device using HTML5 where the browser does not support the interpreted language. The embed code is configured to cause playing of the third content object on the end user device using a player resident on a wireless phone that does not support browser playback using the interpreted language or HTML5.

In still another embodiment machine-readable physical medium having machine-executable instructions for multi-platform playing of content with a web browser referenced on a web page is disclosed. The machine-readable medium comprising code for:
providing embed code customized for content, wherein: the embed code is end user accessible for copying and placement into another web page, and the embed code uses a scripting language configured to perform device detection on an end user device; and
providing content represented in first, second and third encoding formats respectively as first, second and third content objects, wherein: the embed code is configured to cause playing of the first content object on the end user device using an interpreted language in a browser, the embed code is configured to cause playing of the second content object on the end user device using HTML5 where the browser does not support the interpreted language, and the embed code is configured to cause playing of the third content object on the end user device using a player resident on a wireless phone that does not support browser playback using an interpreted language or HTML5.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
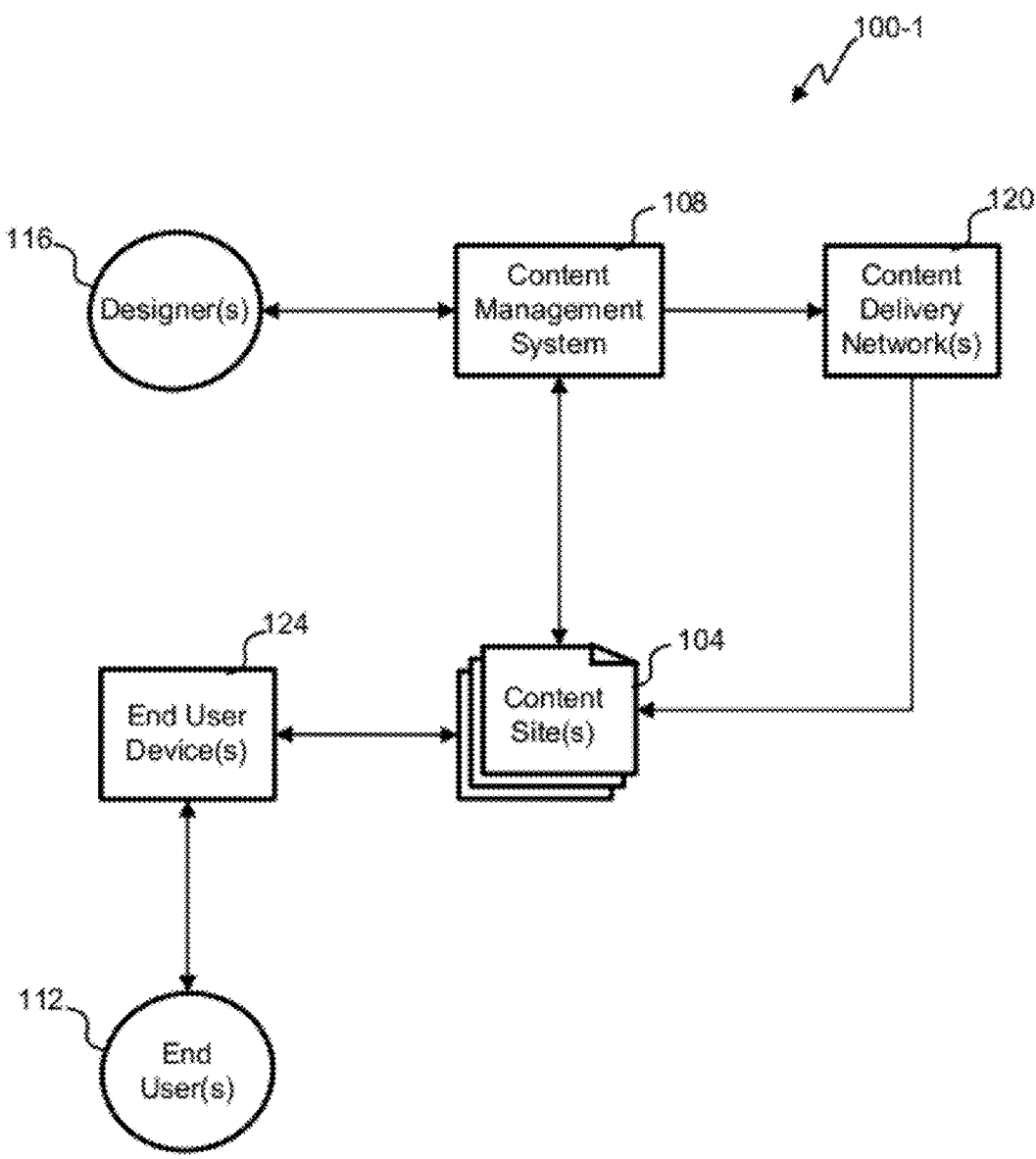
FIG. 1 depicts a block diagram of an embodiment of a content distribution system.

Referring first to FIG. 1, a block diagram of an embodiment of a content distribution system 100 is shown. Designers 116 interact with a content management system (CMS) 108 to syndicate content for end users 112 to enjoy on their end user devices 124. Content sites 104 include web sites that are accessed by the end user devices 124 using a web browser or content player. A content object is any content file or content stream and could include, for example, slideshow, animation, video, and/or audio. The content object could be live, delayed or stored. Throughout the specification, references may be made to a content object, content, content stream and/or content file, but it is to be understood that those terms could be used interchangeably wherever they may appear.

The content sites 104 could be set up by the designer 116 or by end users 112. When the designer 116 originally syndicates content, a content site is typically chosen for embedding code that plays the content object, but there is an option to take embed code from that first content site 104 for placement in another content site 104 by an end user 112. The embed code renders itself or cause the content object to be rendered on any number of end user devices 124. End user devices 124 could be a phone, a smart phone, a tablet, an electronic pad, a personal computer, an IPTV player, a portable music player, a set top box, etc.

This embodiment optionally uses a content delivery network (CDN) 120 to deliver content objects, embed code, web pages, etc. as an alternative or supplement to the CMS 108 can hosting. Designers 116 can syndicate storing their content anywhere, but would often use a CDN 120 for popular content. In some cases, some content is served from the CDN 120, other content is hosted on the content site 104 and still other content is hosted on the CMS 108. As embed code is moved from site to site, hosting of content can remain the same or move in whole or in part. The original designer 116 allowing embed code has less control of how the embed code moves around to various content sites 104.

Other embodiments control how the embed code disseminates across the Internet. The number of times embed code can be propagated in succession can be limited. For example, the designer 116 might only allow their original page be embedded in another content site 104, but prevent embed code being accessible to end users 112 from that second content site 104. Additionally, security could be embedded in the JavaScript™ of the embed code that authenticates the embed code to check for unauthorized modification. A checksum or hash could be calculated in the embed code and passed back to the CMS 108 for authentication, for example.

Figure 2:
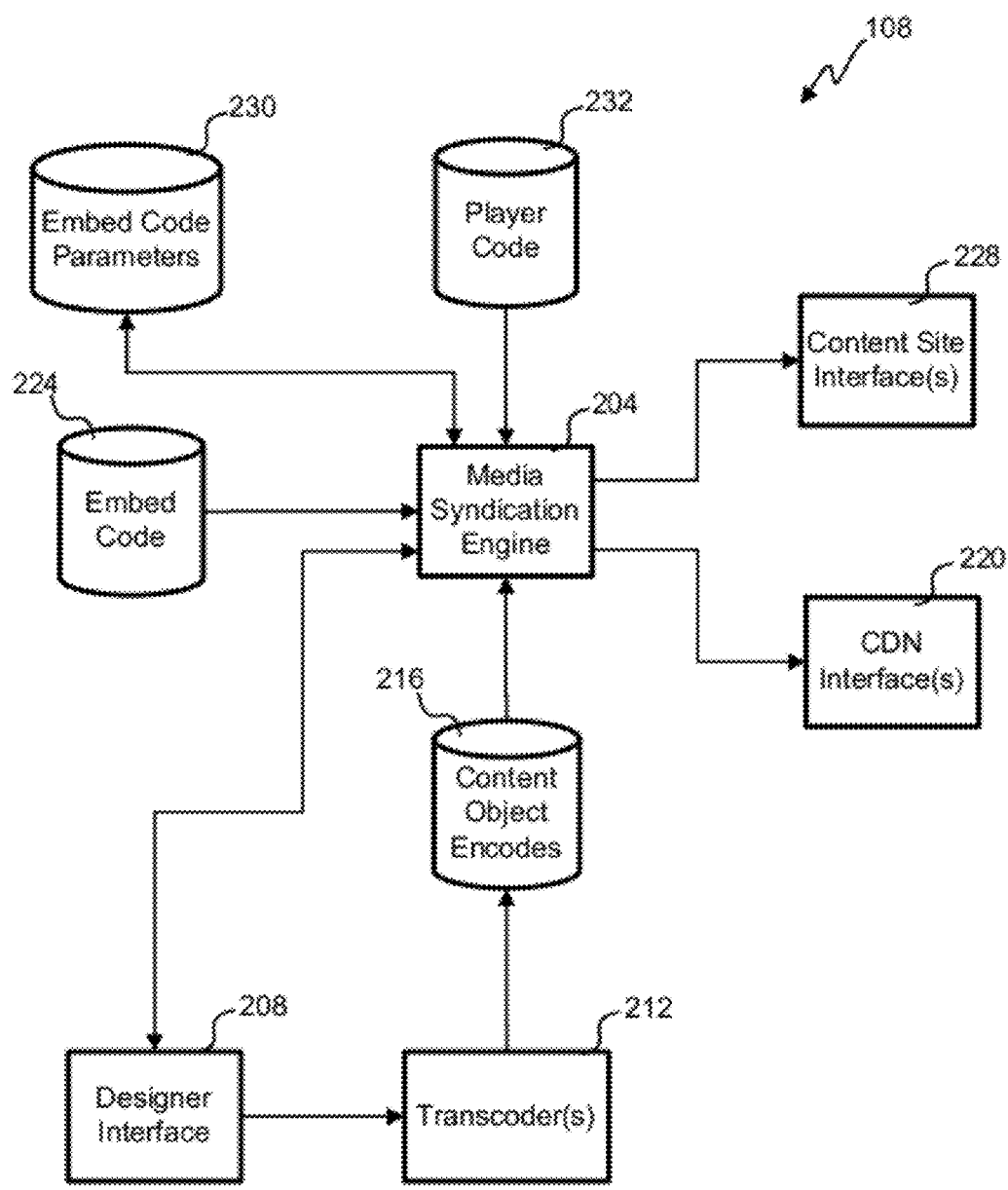
FIG. 2 depicts a block diagram of an embodiment of a content management system.

With reference to FIG. 2, a block diagram of an embodiment of the CMS 108 is shown. To syndicate content, the designer 116 interacts with a designer interface 208. The content object uses a transcoder(s) 212 to be processed into one or more codings, formats, bitrates, protocols, etc. to support all the various end user devices 124. The content object in this embodiment is transcoded into eight different encodes or other representations, but other embodiments could have more or less. The transcoded versions are stored as content object encodes 216.

The designer 116 further interacts with the designer interface 208 to edit the content objects, insert advertizing, specify where the content object should be syndicated, how the content playback applet embeds in a web page, where the content objects are hosted, etc. The designer 116 can edit the content object prior to transcoding. Advertizing can have their location specified for insertion or can be manually spliced into the content object. There are several versions of the Java,™ HTML5 with JavaScript™ or Silverlight™ player that are stored as player code 232. The video players built into browsers and phones are also supported. The designer can define the look and functionality for the player from predefined and/or customized templates.

Embed code parameters 230 are customized by the designer to affect how the embed code will operate on a particular end user device 124. The embed code 224 may check to see if certain fallback content objects are enabled in the embed code parameters 230 to effectively customize operation of the embed code 224 for different domains, clients, zones, sub-directories, content types, end user devices, etc. For example, the designer may not want to pay for mobile format encodings, or they may have disabled them because they don't want users to get access to content that cannot be protected by digital rights management (DRM). The embed code 224 refers back to the embed code parameters 230 upon execution to customize how the embed code 224 operates. This allows modification of the operation of the embed code 224 after placement on a web site without having to update or change the embed code.

Security for the embed code 224 can be configuration with the embed code parameters 230 at any time. The embed code 224 has programming to allow operation at varying levels of security. The security may be managed on the end user device 124, by the content management system 108 or a combination thereof as dictated by the embed code parameters 230. The embed code 224 could query to the embed code parameters 230 to determine what security features to perform on the end user device 124 and which are performed by the content management system 108. In some cases, the embed code 224 and/or the content management system 108 will prevent certain actions from being performed. For example, the end user device 124 could be a model of phone, have out of date DRM, have invalid security certificates, have malfunctioning or obsolete hardware that would cause certain content objects to be unplayable as choreographed by the embed code 224 and any embed code parameters 230.

Embed code 224 is JavaScript™ or another scripting language that executes in a web browser or player on the end user device 124. The embed code 224 is placed in a web page of the content site 104 by the designer themselves or automatically using the media syndication engine 204. The embed code autonomously determines the best way to play a content object in a web browser or player. Different end user devices 124 dictate the need for embed code that can react accordingly to provide consistent playback regardless of the platform. Other embodiments could have server-side logic to determine the best way to play the content object. The server-side logic can support a wider variety of end user devices 124, for example, to support devices without JavaScript™ and/or Flash.™

At the option of the designer, the media syndication engine 204 can automatically syndicate the content. The media syndication engine 204 controls a content site interface 228 and a CDN interface 220. The content site interface 228 can automatically insert the embed code and/or content object, for example, onto social networking sites, blog sites, video sharing sites, etc. The CDN interface 220 is used to place content objects onto one or more CDNs 120 that might host and/or cache the content objects. The CDN interface 220 can supply content objects through pre-population of the CDN 120 or when the CDN 120 experiences a cache miss.

Editing and ad insertion are also performed by the media syndication engine 204. The designer can edit videos and metadata (e.g., title, description, tags) and stitch, cut and otherwise edit video, sound and images. Ad insertion can be done by splicing or overlaying ads directly into the content before delivery or controlled by player logic at run-time to switch-out or overlay the content with an in-place ad, post-plate, or banners at the end user device 124.

Figure 3:
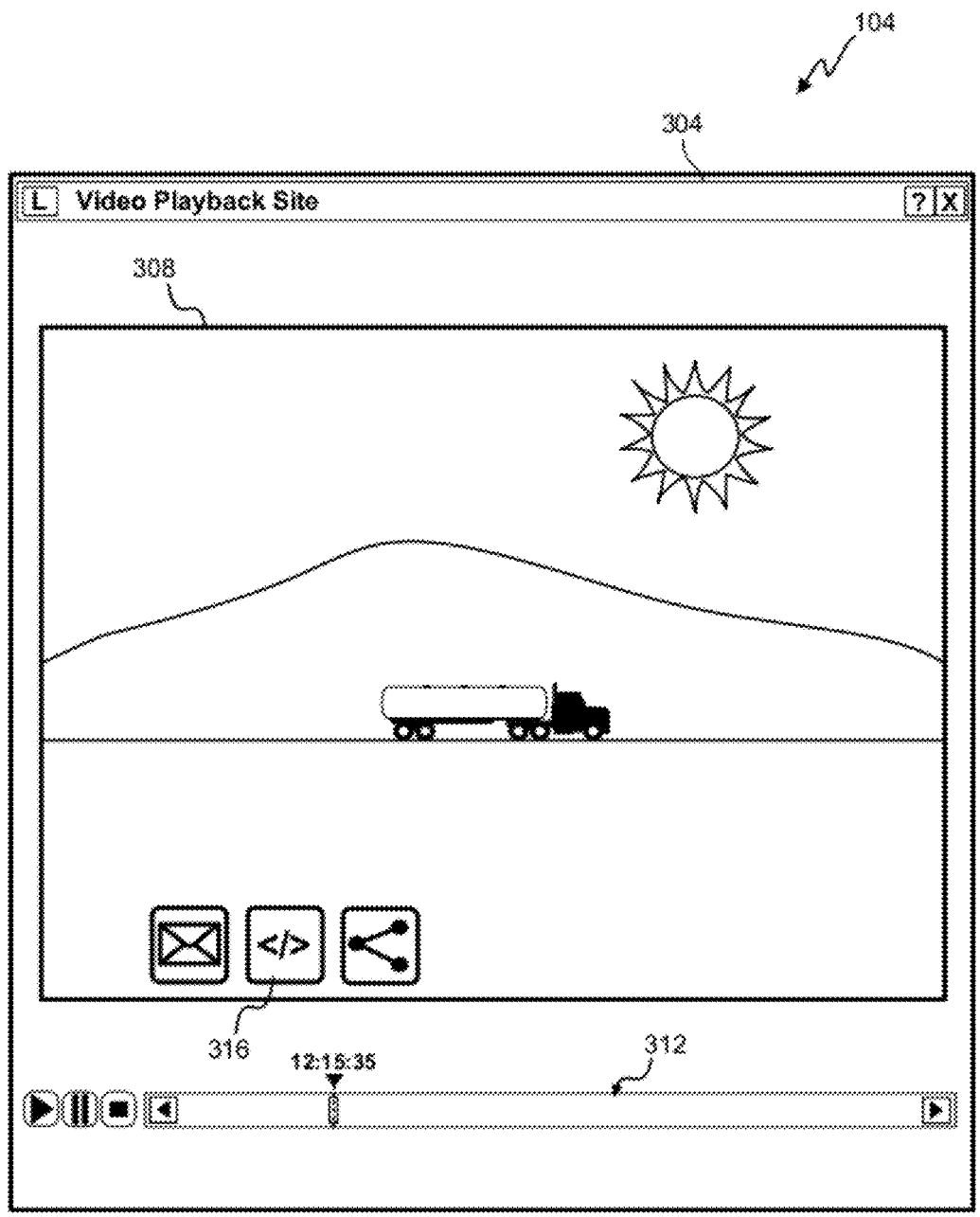
FIG. 3 depicts a screen shot of an embodiment of a content site including video playback within a browser window.

Referring next to FIG. 3, a screen shot of an embodiment of a content site 104 including video playback within a browser window 304 is shown. A playback control 312 allows playing, pausing or stopping the video. A video playback window 308 includes a number of icons in overlay. An embed code icon 316 activates a pop-up window that includes embed code for use in another content site 104. When the embed code icon 316 is selected the embed code is provided locally from the Flash™ player or JavaScript.™ Other embodiments query back to the CMS 108 to get the embed code 224 which could be prestored or formulated on the fly.

Figure 4:
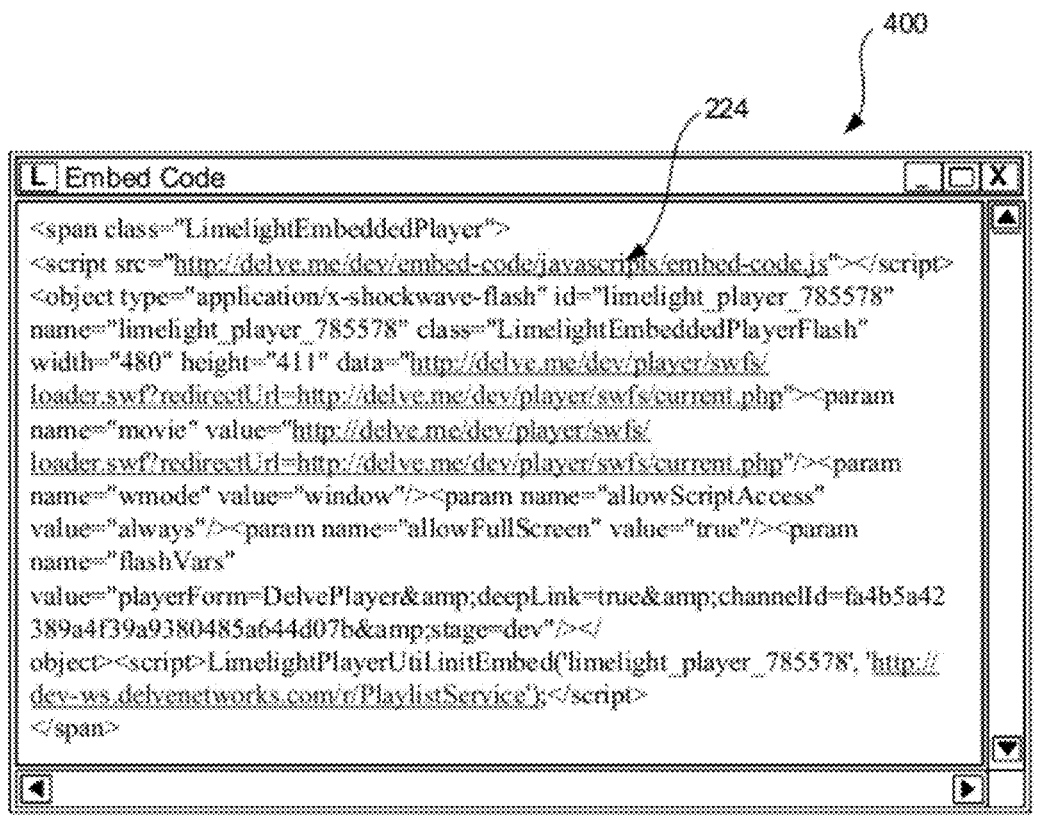
FIG. 4 depicts a screen shot of an embodiment of a window including embed code for insertion into another content site.

With reference to FIG. 4, a screen shot of an embodiment of a pop-up window 400 including embed code 224 for insertion into another content site 104 is shown. This embodiment supports at least three different platforms, but other embodiments could support more. After attempting to activate a flash player to play the content object, HTML5 is attempted, before finally attempting to activate a media player. The end user 112 places the embed code 224 into a web page at a content site 104 of their choosing. Despite being disassociated with the original content site 104, platform detection happens autonomously to support any number of end user devices 124.

Figure 5:
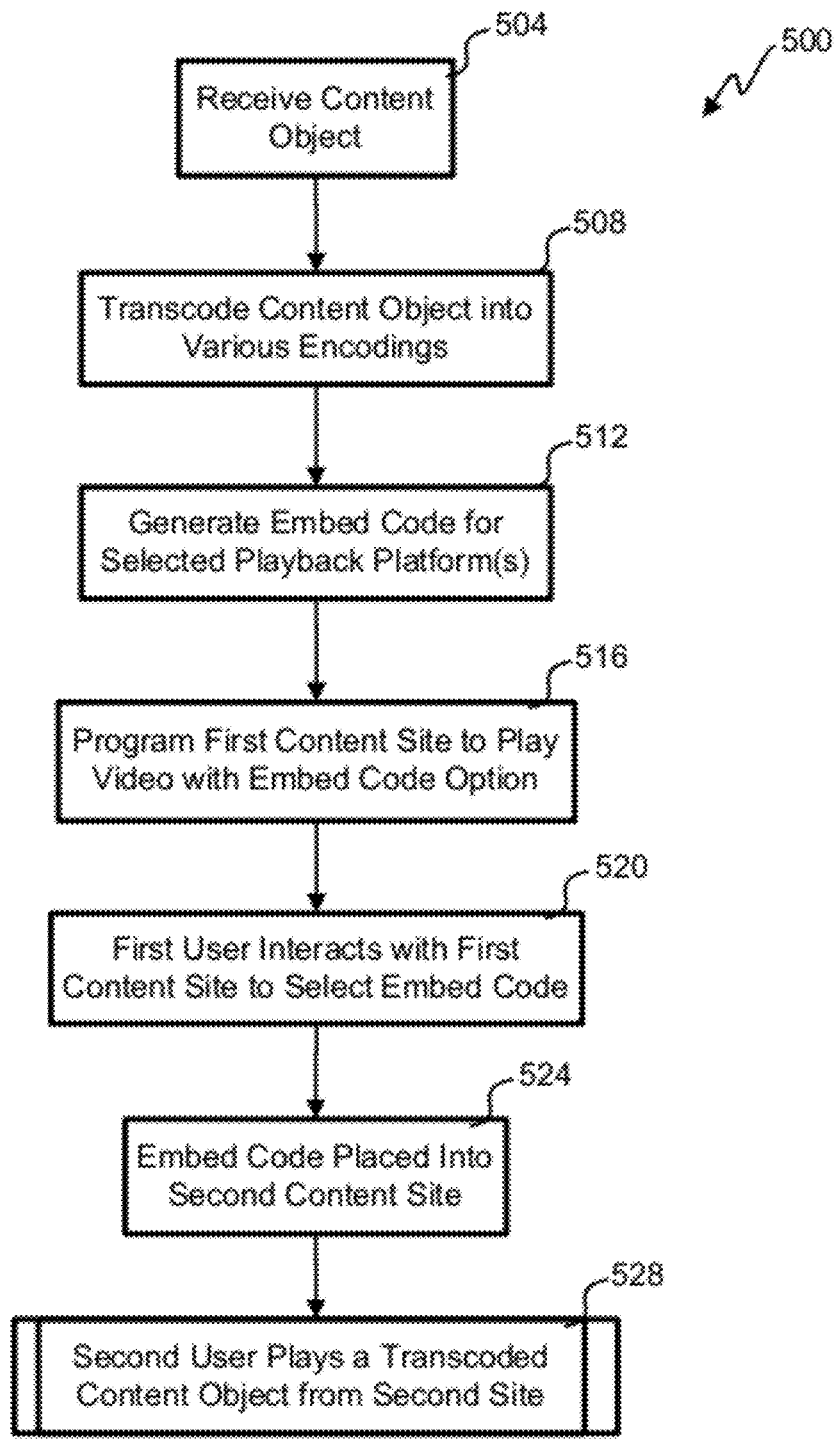
FIG. 5 illustrates a flowchart of an embodiment of a process for syndicating content that is embedded into multiple content sites.

Referring next to FIG. 5, a flowchart of an embodiment of a process 500 for syndicating content that is serially embedded into multiple content sites 104 is shown. The designer 116 uploads using the designer interface 208 one or more content files in block 504. Alternatively, a stream can be identified that might play later if a live event. The transcoder 212 produces a number of encodes and stores those content object encodes 216 in block 508. The designer 116 interacts with the media syndication engine 204 to select various syndication options. Embed code 224 is generated for the given syndication options selected in block 512.

The designer 116 of the media syndication engine 204 embeds the code for playing the content object on a first content site 104. By enabling the embed code icon 316, end users 112 that interact with the content object at the first content site 104 can select embed code 224 that is usable in a second content site 104 of the end user's choosing. The end user 112 places the embed code into the second content site 104 in block 524. In block 528, a different end user 112 plays the content object from the second site 104. In some embodiments, the second content site 104 could also have a embed code icon 316 to facilitate further propagation of the content object to additional content sites 104.

Figure 6A:
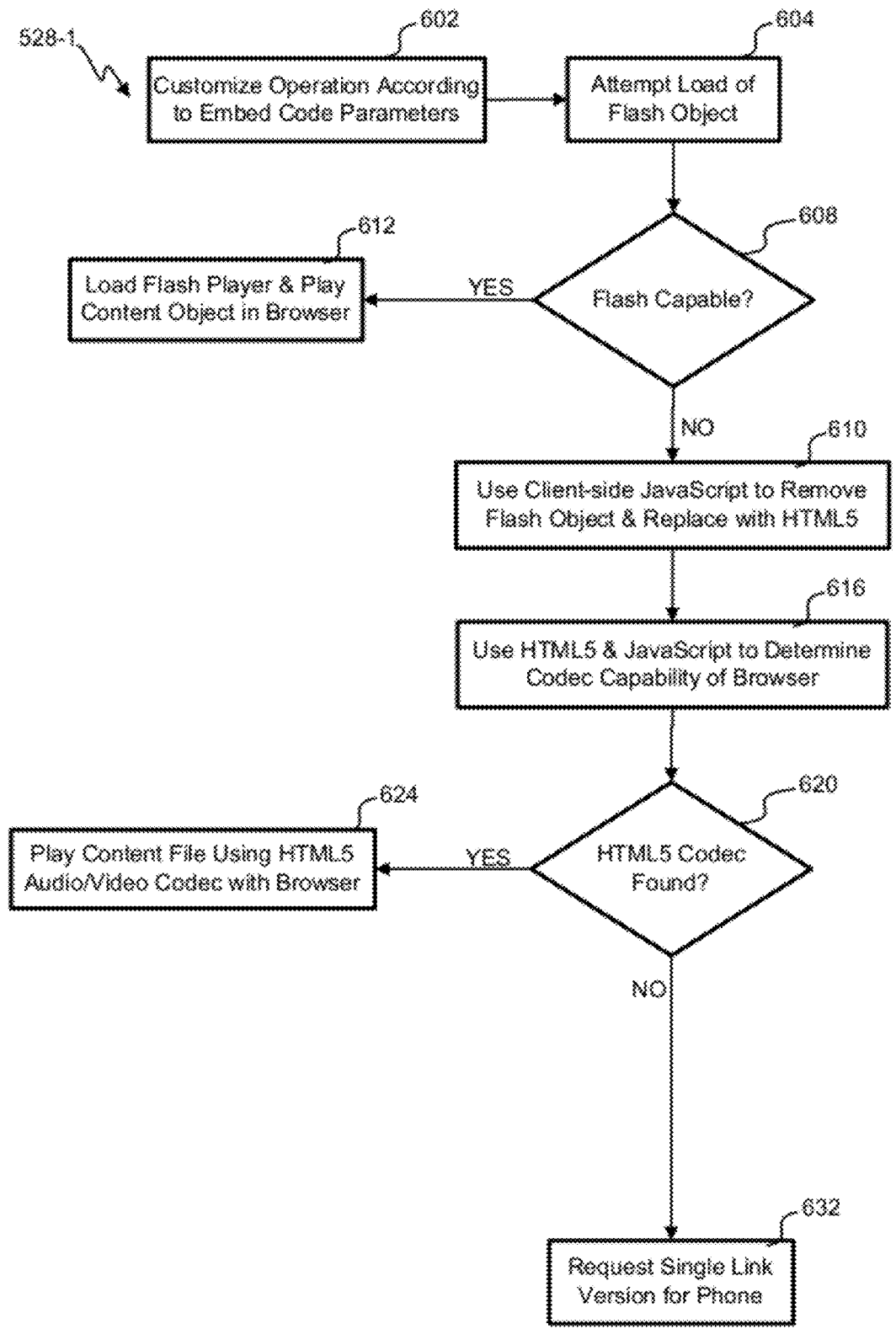
FIGS. 6A, 6B, 6C, and 6D illustrate flowcharts of embodiments of a process for playing content from a web site including the embed code.

With reference to FIG. 6A, a flowchart of an embodiment of a process 528-1 for playing content from a content site 104 including the embed code 224 is shown. The process 528-1 supports various types of end user devices 124 with various types of browsers and content players. An attempt to load a Flash™ player first, before trying HTML5 and finally trying to load a content object into a player built-into or callable from the browser. Personal computers typically will run Flash™ players along with some Android™-based tablets and phones. Even though Android™ devices can support Flash,™ the process 528 may prevent loading of the Flash™ player in favor of HTML5 playback. Apple™ phones, music players and tablets support HTML5, but not Flash™ today. Some smart phones allow playing content in a content player application that is callable or embedded into the browser, for example, newer BlackBerry™ and Symbian™ phones.

The depicted portion of the process 528-1 starts in block 602 where the embed code can optionally query the content management system 108 for embed code parameters 230. The embed code parameters 230 can do any number of customizations that are programmed into the embed code. For example, the order in which different content object encodes are attempted can be changed, certain options can be disabled altogether, security options can be activated or disabled, etc. The embed code parameters 230 can be modified after the embed code 224 is placed in a web site to allow future customizations without needing to modify the embed code 224 itself. The embed code 224 might check to see if the hosting web site has all the functionality and curtail it accordingly. For example, the top level domain could be .CN and that could cause none of the content objects to be rendered by the embed code.

Presuming proper authorization by the embed code parameters 230, the end user device 124 attempts to load a Flash™ object in block 604. If Flash-capable as determined in block 608, the Flash™ player is loaded in block 612 and the content object is played in an encode that will render well on the end user device 124 in their browser. In some cases, the end user device 124 is technically capable of executing the Flash™ player, but may not have the screen resolution or processing power to have adequate quality of service (QoS). The Flash™ player can choose from a number of different encodes to pick the one that is likely to provide adequate QoS for the particular end user device 124. For example, some Android™ phones are Flash™ capable, but may not have the quality that the designer envisioned 116. As a syndication option, the designer 116 can exclude Android™ devices from playing the content object with a Flash™ player.

Should it be determined that the Flash™ object was not loaded for whatever reason in block 608, processing continues to block 610. Client-side JavaScript™ running will remove the Flash™ <object> tag and surrounding markup and replace it with HTML5 markup and scripting. In block 616, the HTML5 creates a video or audio tag and determine if it is recognized. For example, a HTML5 video tag is created and if H.264 playback is recognized, the web browser can play that codec as is determined in block 620. Using JavaScript™ to determine if the browser supports a specific codec, the browser will return "probably", "maybe", or " " (an empty string), where " " (an empty string) means that the browser doesn't support the codec at all. Once we get the response like "probably" or "maybe", we create the HTML5 video/audio tag and leave it up to the browser to attempt to playback the content. The browser plays the content file of the proper encode in block 624 using HTML5 if the H.264 codec is supported.

Should the video tag not be recognized, it is presumed that HTML5 is not supported and a single-link URL is requested for the content object having a well-supported encoding (e.g., 3GP™) to playback on what is likely to be, but not necessarily, a smart phone. Some simple phones with a web browser will not support the encoding and will display an error. Browser-detection can use the canPlayType( ) mechanism or it might just use user-agent detection or other means. If the encode is supported, a player on the smart or simple phone is activated to play back the content object. For example, newer Blackberry™ devices will play the content object from the single-link URL, but older ones may not. The end user device 124 is typically a phone if it does not support either Flash™ or HTML5, but not necessarily so. The single-link URL could be any end user device 124 that does not support either Flash™ or HTML5.

Although this embodiment favors a Flash™ player, other embodiments may choose differently. The process could try HTML5 playback prior loading Flash™ as one of many fallbacks. Additionally, other embodiments could support a Silverlight™ player as an option instead of the Flash™ or as a fallback when the Flash™ player is not used. Some embodiments may give the designer 116 the option to change the priority at which the various options are tried or may give the ability to only modify some of the priorities. For example, one designer might choose to only support a Silverlight™ player before requesting a single link version.

Figure 6B:
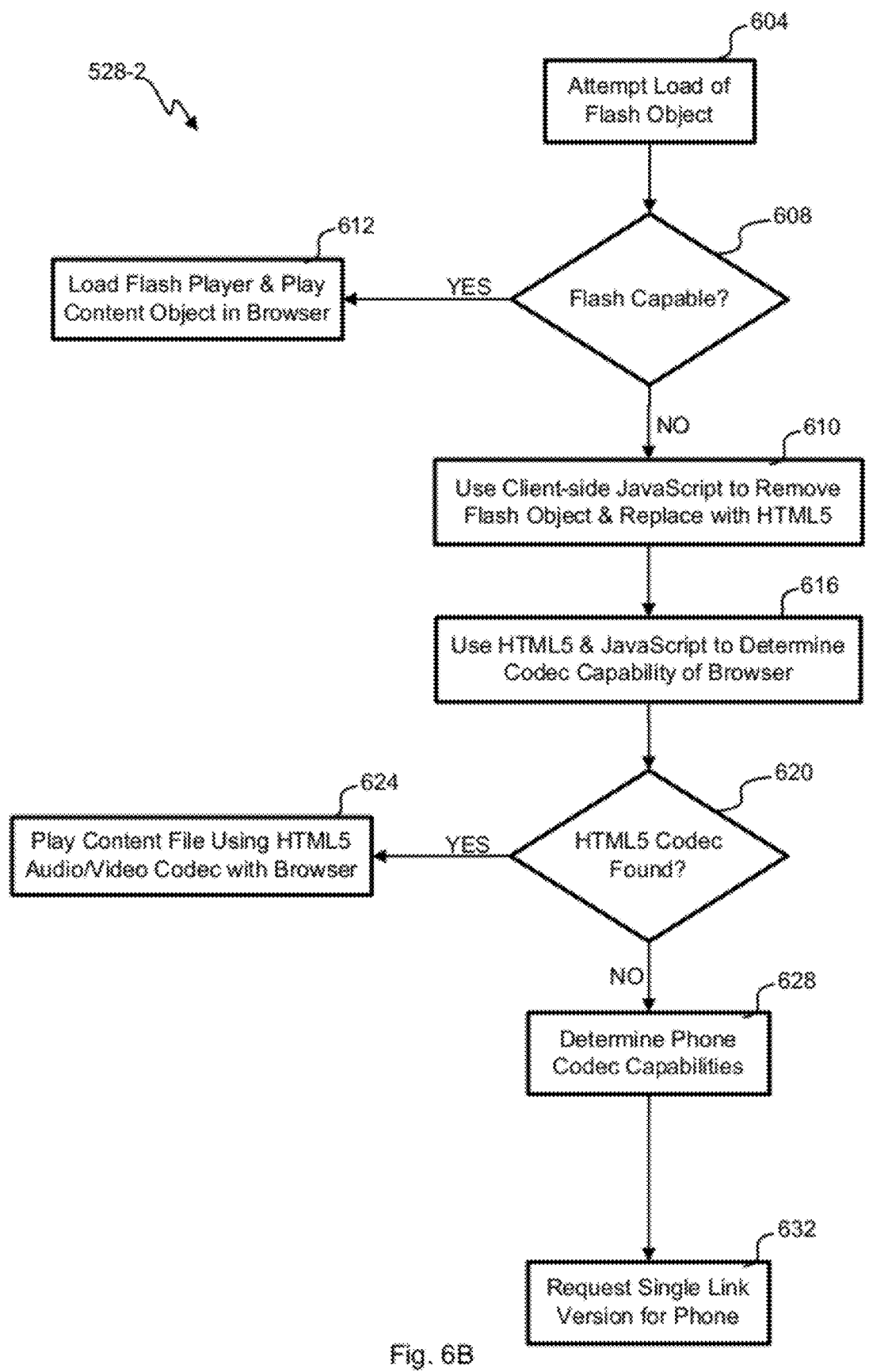

With reference to FIG. 6B, a flowchart of another embodiment of a process 528-2 for playing content from a content site 104 including the embed code 224 is shown. This embodiment is similar to that of FIG. 6A, but inserts a block 628 between block 620 and block 632. Before requesting the single-link URL, the embed code attempts to determine the capability of the phone to select from a number of single-link URLs corresponding to a plurality of encodes. For example, a motion-JPEG could be selected for one end user device 124 and 3GP™ for another.

Other embodiments could support embedded players in the end user device that have playlist capability. A list of URLs could be played by as a playlist by these players. The playlist-capable player could be checked for prior to block 632, where the single link version would serve as a fallback.

Figure 6C:
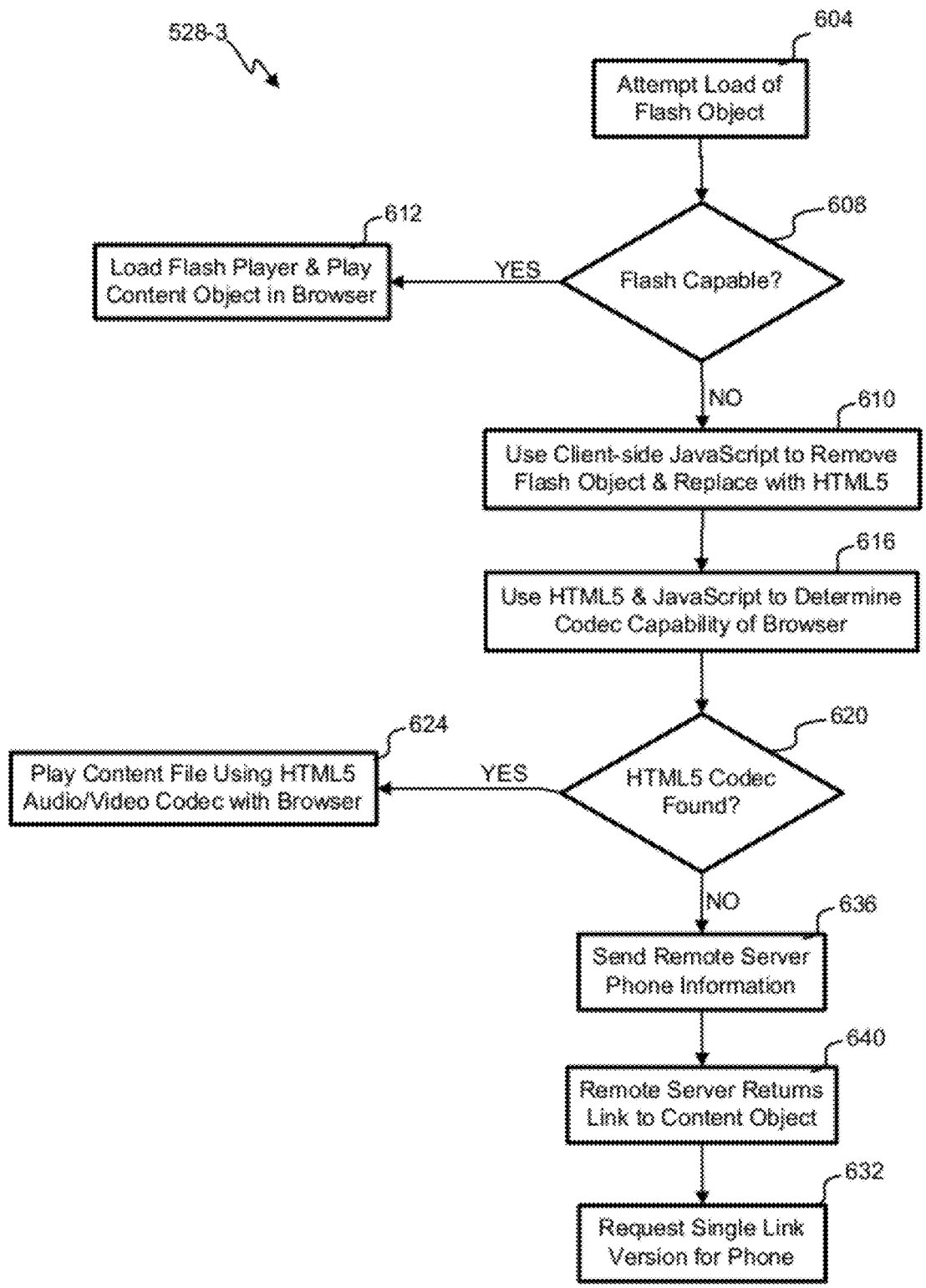

With reference to FIG. 6C, a flowchart of yet another embodiment of a process 528-3 for playing content from a content site 104 including the embed code 224 is shown. This embodiment differs from the embodiment of FIG. 6A in that two blocks 636, 640 are inserted between blocks 620 and 632. If neither either Java™ or HTML5 is supported by the end user device 124, information is gathered by the embed code about the end user device, for example, browser version, phone manufacturer, phone model, codec capability, screen size, processing power, audio capability, and/or cookie information from previous playback, could be passed to a remote server such as the media syndication engine 204. The query to the remote server could be in the form of a URL with the information embedded in the URL. A determination is made remotely and a link to the appropriate encode is returned in block 640.

Figure 6D:
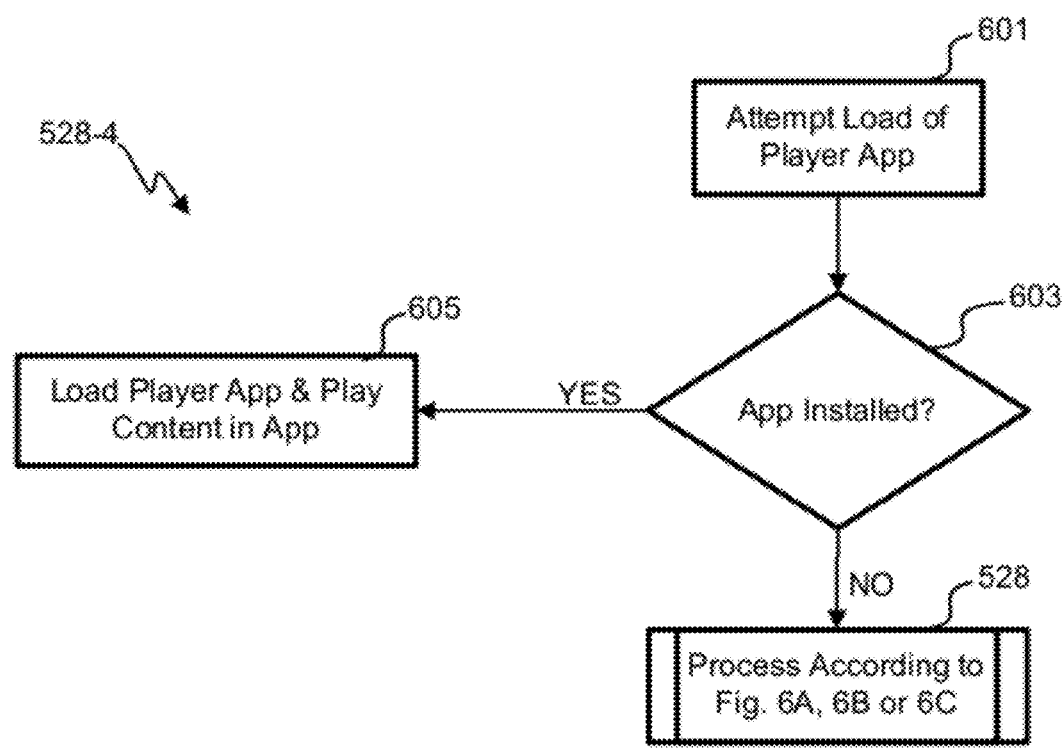

Referring next to FIG. 6D, a flowchart of still another embodiment of a process 528-4 for playing content from a content site 104 including the embed code 224 is shown. This embodiment supports an application or app for the iPhone/iPod/iPad™ or Andriod™ platforms before operating like the other embodiments in FIGS. 6A, 6B and 6C. Specifically, the JavaScript™ attempts to load the player app in block 601. If it doesn't load because it is not installed or inoperable as determined in block 603, processing continues to the group of blocks in 528. Should the app load and be operable, the content is played by the app in block 605.

Although above embodiments detect the way to play the content object, other embodiments could use server-side detection in some cases. For example, detection could be done with a an <iframe> on the client side pointing to a page that does server-side device detection. A Flash™ player, HTML5 or media player could be used to play the content object based upon that server-side detection.

Other embodiments could try different playback methods or new playback methods in any order. The order could be defined by the embed code parameters. For example, there could be thirty different possible ways to play encodes corresponding to some content. The embed code parameters could define which of the thirty to attempt and in what order. For example, Flash™ could be tried first before falling back to Silverlight,™ then JavaFX,™ etc. In another example, there could be multiple HTML5 encodes (e.g., H.264,™ WebM,™ or Ogg Theora™) that are specified for use for different end user devices. There could be encodes at different quality levels that could be specified for a particular player under certain circumstances. For example, a Silverlight™ player could use a high-definition encode for a 1080p screen, but a lower quality encode for screens with less resolution.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A playback system for multi-platform playing of content with a web browser, the playback system comprising:
an embed code interface hosted on a hardware server, wherein:
the embed code interface provides embed code customized for content referenced on a web page,
the embed code is end user accessible for copying and placement into another web page,
the embed code uses a scripting language configured to perform device detection on an end user device,
the embed code, based on device detection of a first end user device, determines to cause playing of a first content object on the first end user device, and then cause playing of a second content object on the first end user device should loading the first content object on the first end user device not occur, wherein:
the first content object has a first encode;
the second content object has a second encode; and
the first encode and the second encode are both representations of the content; and
the embed code, based on device detection of a second end user device, determines to cause playing of a third content object on the second end user device, and then cause playing of a fourth content object on the second end user device should loading the third content object on the second end user device not occur, wherein:
the third content object has a third encode;
the fourth content object has a fourth encode; and
the third encode and the fourth encode are both representations of the content.

2. The playback system for multi-platform playing of content with the web browser as recited in claim 1, wherein two of the first, second and third encodes use a same codec.

3. The playback system for multi-platform playing of content with the web browser as recited in claim 1, wherein the embed code queries the device to determine supported playback format, screen size, model number, and/or manufacturer.

4. The playback system for multi-platform playing of content with the web browser as recited in claim 1, wherein:
the embed code passes parameters gathered from the device to a remote server, and
the remote server directs the embed code to the third content object.

5. The playback system for multi-platform playing of content with the web browser as recited in claim 1, wherein:
parameters are received from a remote server by the embed code operating on the end user device, and
the embed code adjusts operation of the embed code according to the parameters.

6. The playback system for multi-platform playing of content with the web browser as recited in claim 1, wherein the first content object is the same as the fourth content object.

7. A method for multi-platform playing of content with a web browser, the method comprising:
providing embed code customized for content referenced on a web page, wherein:
the embed code is end user accessible for copying and placement into another web page,
the embed code uses a scripting language configured to perform device detection on an end user device; and
providing content represented in a plurality of encoding formats, wherein:
the embed code, based on device detection of a first end user device, determines to cause playing of a first content object on the first end user device, and then cause playing of a second content object on the first end user device should loading the first content object on the first end user device not occur, wherein:
the first content object has a first encode;
the second content object has a second encode; and
the first encode and the second encode are both representations of the content; and
the embed code, based on device detection of a second end user device, determines to cause playing of a third content object on the second end user device, and then cause playing of a fourth content object on the second end user device should loading the third content object on the second end user device not occur, wherein:
the third content object has a third encode;
the fourth content object has a fourth encode; and
the third encode and the fourth encode are both representations of the content.

8. The method for multi-platform playing of content with the web browser as recited in claim 7, further comprising querying the device with the embed code to determine supported playback format, screen size, model number, and/or manufacturer.

9. The method for multi-platform playing of content with the web browser as recited in claim 7, further comprising:
sending parameters to a remote server that are gathered by the embed code operating on the end user device, and
directing the embed code to the third content object by the remote server.

10. A non-transitory machine-readable physical medium having machine-executable instructions for multi-platform playing of content with a web browser referenced on a web page, the machine-readable medium comprising code for:
providing embed code customized for content, wherein:
the embed code is end user accessible for copying and placement into another web page,
the embed code uses a scripting language configured to perform device detection on an end user device; and
providing content represented in a plurality of encoding formats, wherein:
the embed code, based on device detection of a first end user device, determines to cause playing of a first content object on the first end user device, and then cause playing of a second content object on the first end user device should loading the first content object on the first end user device not occur, wherein:
the first content object has a first encode;
the second content object has a second encode; and
the first encode and the second encode are both representations of the content; and
the embed code, based on device detection of a second end user device, determines to cause playing of a third content object on the second end user device, and then cause playing of a fourth content object on the second end user device should loading the third content object on the second end user device not occur, wherein:
the third content object has a third encode;
the fourth content object has a fourth encode; and
the third encode and the fourth encode are both representations of the content.

11. The non-transitory machine-readable physical medium having machine-executable instructions for multi-platform playing of content with the web browser referenced on the web page as recited in claim 10, further comprising querying the device with the embed code to determine supported playback format, screen size, model number, and/or manufacturer.

12. The non-transitory machine-readable physical medium having machine-executable instructions for multi-platform playing of content with the web browser referenced on the web page as recited in claim 10, further comprising choosing the third content object with the embed code from a plurality of encodes according to an analysis of the device by the embed code.

13. The non-transitory machine-readable physical medium having machine-executable instructions for multi-platform playing of content with the web browser referenced on the web page as recited in claim 10, further comprising:
receiving parameters by a remote server that are gathered by the embed code from the device to, and
directing the embed code to the third content object by the remote server.

\* \* \* \* \*